March 15, 1960 W. H. BROWN 2,928,234
EXHAUST NOZZLE
Filed Feb. 11, 1955
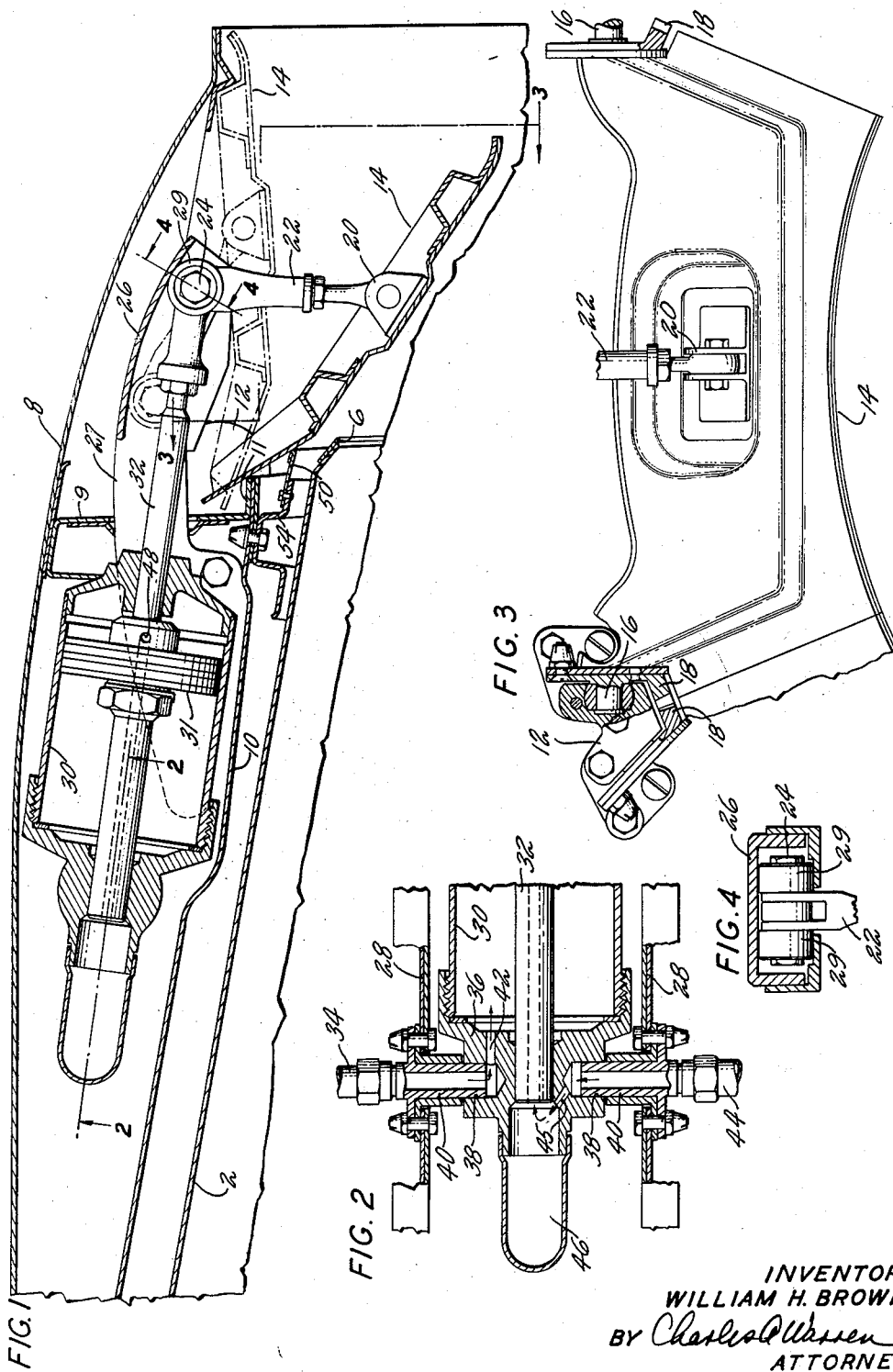
INVENTOR
WILLIAM H. BROWN
BY Charles A. Warren
ATTORNEY

United States Patent Office 2,928,234
Patented Mar. 15, 1960

2,928,234
EXHAUST NOZZLE

William H. Brown, Manchester, Conn., assignor to United Aircraft Corporation, East Hartford, Conn., a corporation of Delaware Application February 11, 1955, Serial No. 487,677

16 Claims. (Cl. 60—35.6)

This invention relates to variable area thrust nozzles for use particularly with gas turbines and other jet engines.

The area of the thrust nozzle may be varied by the use of a plurality of hinged flaps arranged in a ring about the nozzle and all movable as a unit about the tangentially positioned hinges into a position more or less constricting the nozzle. A nozzle of this type is shown, for example, in the co-pending application of Meyer Serial No. 234,256, filed June 29, 1951, now Patent No. 2,813,-395 in which the several flaps are individually connected by links to a surrounding ring. When the ring is shifted axially, the links move from a generally axial position into a substantially radial position thereby moving the flaps inward for constricting the nozzle. The present invention is in certain respects an improvement on this construction in that the outer ends of the links are guided on tracks rather than being supported by a surrounding ring thereby assuring uniform movement of all of the flaps.

Another feature is the curvature of the track for the links so as to improve the mechanical advantage for moving the flaps. Another feature is the gearing together of all of the flaps so that they will all move as a unit into or out of constricting position. Another feature is the arrangement of the actuating linkage so that when the flaps are open, a convergent-divergent nozzle is formed.

One particular feature is the arrangement of the support for the links such that as the pressure on the flaps increases due to greater constriction of the nozzle, the links will approach a position at right angles to the flaps to minimize the actuating pressure required on the links.

Other objects and advantages will be apparent from the specification and claims, and from the accompanying drawings which illustrate an embodiment of the invention.

Fig. 1 is a longitudinal sectional view through the thrust nozzle.

Fig. 2 is a sectional view substantially along the line 2—2 of Fig. 1.

Fig. 3 is a plan view of one of the flaps with parts broken away substantially along the line 3—3 of Fig. 1.

Fig. 4 is a fragmentary sectional view substantially along the line 4—4 of Fig. 1.

The invention is shown in connection with a duct 2 having an exhaust nozzle 6 on its downstream end. The duct and the exhaust nozzle are surrounded by an outer casing ring or outer duct 8 which is spaced radially from the main duct to provide space for the mounting of the actuating means for the constricting flaps hereinafter described. The outer ring 8 and the fixed nozzle 6 are held in radially spaced concentric relation to each other by a spacer ring 9 extending between ring 8 and the nozzle 6.

Immediately surrounding and extending in generally parallel relation to the duct 2 is a shell 10 which constitutes a heat shield and which has, at its downstream end a supporting ring 11 carrying a plurality of angularly spaced hinge brackets 12. A plurality of flaps 14 arranged in a ring around the nozzle 6 are hinged to the brackets. Each flap carries a hinge pin 16 at opposite ends of its outer edge and these pins engage with the brackets which, as shown, are located between adjacent flaps. Both pins on each flap are in alignment so that each flap is pivoted on an axis substantially tangential to the periphery of the nozzle 6 or to the support ring 11.

Each flap carries, adjacent to each hinge pin, a bevel gear segment 18 fixed to each flap to move with it, and in a position to mesh with the similar gear segment on the adjacent flap. With this arrangement all of the flaps are caused to move simultaneously and equally about their hinge pins to assure uniform constriction of the nozzle on all sides.

Each flap 14 has a projecting lug 20 on its outer surface to which is pivoted one end of a link 22. The other end of the link is pivoted on a pin 24 which is guided in a curved track 26 supported as by brackets 27 on longitudinally extending webs 28 attached to ring 11 and to shell 10 on the outer duct 8. This curved track is arcuate about a center of curvature which is located adjacent to the axis of the duct, as will be apparent, and the downstream end of the track is closer to the axis of the duct than the upstream end so that as the pin 24 is moved rearwardly into the full line position the pin is also moved radially inward. It will be apparent that, in the inoperative or open position of the flaps 14, the link 22 extends at an acute angle to the axis or in a generally axial direction. As the guide pin 24 is moved rearwardly, the link pivots on the lug 20 and moves the flaps inwardly. While the flap 14 is in the inoperative or nearly inoperative position no substantial pressure is required for starting the inward movement of the flap.

As the flap approaches its innermost constricting position, more and more pressure is required to move the flap because of the pressure of fluid passing through the nozzle. As the flap reaches the inner or constricting position the link approaches a position which is substantially at right angles to the axis of the nozzle and which approaches a position more nearly at right angles both to the flap and to the track to produce a form of toggle action so that the pressure required on pin 24 for moving the flap does not increase excessively. With the track curved in the direction shown, it is apparent that the curvature of the track aids in moving the flap into its innermost position.

The pin 24 carries rollers 29 which engage the cam 26 as shown in Fig. 4, the cam being box-shaped in cross section. The actuating means for the pin 24 is a fluid motor including a cylinder 30 carrying a piston 31 therein. The piston has a projecting rod 32 the downstream end of which is connected to the pin 24. Fluid under pressure is admitted through a conduit 34 to the upstream end of the cylinder to supply the actuating force for moving the flaps into constricting position. The fluid under pressure may be the gas discharged from the compressor of a gas turbine power plant where the nozzle 6 is used in conjunction with such a power plant.

Because of the curvature of the cam track 26, the cylinder 30 is mounted so it can pivot to permit the end of the piston rod 32 to follow the track curvature. To this end, the cylinder head 36 at the upstream end of the cylinder has radially extending bores 38 therein to receive the end of hollow pivot pins 40 secured in the longitudinally extending webs 28. These pins 40 turn in the bores 38 as will be apparent.

The actuating fluid for the fluid motor is delivered through the pivot pins 40. The conduit 34 delivers fluid to one of the pins and this fluid flows through an axial passage 42 in the inner end of one of the bores 38 to the left hand or upstream end of the cylinder 30. Another fluid conduit 44 is connected to the other pivot pin. From this conduit fluid reaches the downstream end of the cylinder through an axial passage 45 into a chamber 46 enclosing the upstream end of piston rod 32. The piston rod is hollow, as shown, and has a radial passage 48 on the downstream side of the piston for the flow of fluid into this end of the cylinder.

It will be understood that suitable valving may be used for selectively connecting either conduit 34 or 44 to a source of fluid under pressure thereby causing the flaps to move inwardly for constricting the nozzle area or for moving the flaps outwardly to increase the flow area.

A separate actuating piston and cylinder is provided for each of the flaps and fluid under pressure is supplied to all of the actuating cylinders simultaneously thereby moving the flaps simultaneously into nozzle constricting position.

The space between the nozzle 6 and the flaps 14 may be sealed when the flaps are in nozzle constricting position by the use of an annular sealing strip 50 engaging with the inner surfaces of the flaps 14. This sealing ring may be mounted as a unit on a supporting ring 54 attached to the shell 10 adjacent its downstream end.

When the nozzle is not constricted, that is, when the flaps are in their outer position they are so located as to form a passage downstream of the fixed nozzle that is divergent in a downstream direction. The result is accordingly a convergent-divergent nozzle with the converging portion supplied by the fixed nozzle and the diverging portion formed by the nozzle flaps. This is particularly important when the fluid flow through the nozzle is at or above sonic velocity. As shown in the dot-dash lines in Fig. 1 the flaps 14 at their downstream ends engage with and are supported by the downstream end of the casing ring when the flaps are in their outer position.

It is to be understood that the invention is not limited to the specific embodiment herein illustrated and described but may be used in other ways without departure from its spirit as defined by the following claims.

1. In a variable area nozzle, a duct, a plurality of flaps each individually hinged on an axis substantially tangential to the duct for movement of each flap toward or away from the duct axis in restricting or opening the nozzle, a plurality of links, one for each flap, each link pivoted at one end on the associated flap at a point spaced from the hinge axis, support means surrounding said duct and flaps, a plurality of axially extending curved tracks, one for each link, each of said tracks being mounted on said supporting means and guiding the other end of each link, and means for moving said other end of each link axially along said track.

2. In a variable area nozzle, a duct, a plurality of flaps each individually hinged on an axis substantially tangential to the duct for movement of each flap toward or away from the duct axis in restricting or opening the nozzle, a link pivoted at one end on each flap at a point spaced from the hinge axis, support means surrounding said duct and flaps, a plurality of separate axially extending curved tracks, one for each flap, each of said tracks being mounted on said supporting means and engaging with and guiding the other end of the link for the associated flap, and means for moving said other end of each link axially along said track.

3. In a variable area thrust nozzle, a fixed nozzle, a plurality of nozzle flaps pivoted in a ring around the fixed nozzle and projecting downstream therefrom, a link pivoted at one end on each flap, a casing ring surrounding said nozzle and flaps, a plurality of tracks extending axially of the nozzle and supported from said casing ring, there being a track for each flap, the other end of said link being guided by one of said tracks, and means for moving said other end of the link along said track.

4. In a variable area thrust nozzle, a fixed nozzle, a plurality of nozzle flaps pivoted in a ring around the fixed nozzle and projecting downstream therefrom, a plurality of links one for each flap with one end of each link pivoted to the associated flap, a plurality of tracks each extending axially of the nozzle, said plurality of tracks being arranged in a ring around the flaps, support means surrounding said nozzle and on which said tracks are mounted, and each track guiding the other end of one of the links one end of each track being closer to the nozzle axis than the other, and means for moving said other ends of the several links along their respective tracks.

5. In a variable area thrust nozzle, a fixed nozzle, a plurality of nozzle flaps pivoted in a ring around the fixed nozzle and projecting downstream therefrom, a link pivoted at one end on each flap, a casing ring surrounding said nozzle and flaps, a plurality of tracks extending axially of the nozzle and supported from said casing ring, there being a track for each flap, the other end of said link being guided by one of said tracks, and means for moving said other end of the link along said track, one end of the track being closer to the nozzle axis than the other.

6. In a variable area thrust nozzle, a plurality of nozzle flaps pivoted in a ring around the fixed nozzle and projecting downstream therefrom, a link pivoted at one end on each flap, a casing ring surrounding said nozzle and flaps, a plurality of tracks extending axially of the nozzle and supported from said casing ring, there being a track for each flap, the other end of said link being guided by one of said tracks, and means for moving said other end of the link along said track, said moving means being in the form of a cylinder and piston, a connection from said piston to said link adjacent said other end, said piston being pivotally mounted to permit the link to follow the track one end of each track being closer to the nozzle axis than the other end.

7. In a variable area thrust nozzle, a fixed nozzle, a plurality of nozzle flaps pivoted in a ring around the fixed nozzle and projecting downstream therefrom, a link pivoted at one end on each flap, support means surrounding said nozzle and flaps, a track mounted on said support means and extending axially of the nozzle, said track being curved from end to end, and means for moving the other end of the link along said track.

8. In a variable area thrust nozzle, a fixed nozzle, a plurality of nozzle flaps pivoted in a ring around the fixed nozzle and projecting downstream therefrom, a link pivoted at one end on each flap, a track extending axially of the nozzle and being curved from end to end, and means for moving the other end of the link along said track, said moving means being in the form of a cylinder and piston, a connection from said piston to said link adjacent said other end, said piston being pivotally mounted to permit the link to follow the track.

9. In a variable area thrust nozzle, a fixed nozzle, a plurality of nozzle flaps pivoted in a ring around the fixed nozzle and projecting downstream therefrom, a link pivoted at one end on each flap, a track extending axially of the nozzle and being curved from end to end, with the downstream end of the track closer to the nozzle axis than the upstream end, and means for moving the other end of the link along said track, said moving means being in the form of a cylinder and piston, the piston being connected to the link at said other end for actuating it, and means for pivotally mounting the cylinder to adjust the cylinder to the curvature of the track.

10. A variable area thrust nozzle including a plurality of nozzle flaps arranged in a ring, supporting means for said flaps and on which the flaps are pivoted, a link pivoted at one end on each flap, a curved track for each flap extending axially of the nozzle and on which the other end of the link is guided, one end of the track being nearer the nozzle axis than the other, a support ring for said tracks in fixed relation to said supporting means, and means for moving said other end of the link in said track.

11. A variable area thrust nozzle including a plurality of nozzle flaps arranged in a ring, supporting means for said flaps and on which the flaps are pivoted, a link pivoted at one end on each flap, a track extending axially of the nozzle and on which the other end of the link is guided, a support ring for said track in fixed relation to said supporting means, and means for moving said other end of the link in said track, one end of the track being closer to the nozzle axis than the other.

12. A variable area thrust nozzle including a plurality of nozzle flaps arranged in a ring, supporting means for said flaps and on which the flaps are pivoted, a link pivoted at one end on each flap, a track extending axially of the nozzle and on which the other end of the link is guided, a support ring for said track in fixed relation to said supporting means, and means for moving said other end of the link in said track, said track being curved from end to end and the downstream end of the track being closer to the nozzle axis than the other end.

13. A variable area thrust nozzle including a plurality of nozzle flaps arranged in a ring, supporting means for said flaps and on which the flaps are pivoted, a link pivoted at one end on each flap, a track extending axially of the nozzle and on which the other end of the link is guided, a support ring for said track in fixed relation to said supporting means, and intermeshing gears on adjacent flaps to cause all the flaps to move equally.

14. A variable area thrust nozzle including a plurality of nozzle flaps arranged in a ring, supporting means for said flaps and on which the flaps are pivoted, a link pivoted at one end on each flap, a track extending axially of the nozzle and on which the other end of the link is guided, a support ring for said track in fixed relation to said supporting means, and means for moving said other end of the link in said track, said track being curved from end to end and the downstream end of the track being closer to the nozzle axis than the other end, and intermeshing gears on adjacent flaps to cause all the flaps to move equally.

15. A variable area thrust nozzle including a plurality of nozzle flaps arranged in a ring, supporting means for said flaps and on which the flaps are pivoted, a link pivoted at one end on each flap, a track extending axially of the nozzle and on which the other end of the link is guided, a support ring for said track in fixed relation to said supporting means, and interconnecting means on adjacent flaps to cause equal movement of said flaps.

16. In a variable area thrust nozzle, a fixed nozzle, a plurality of nozzle flaps pivoted in a ring around the fixed nozzle and projecting downstream therefrom, a link pivoted at one end on each flap, a track extending axially of the nozzle in which the other end of said link is guided, and means for moving said other end of the link along said track, said nozzle flaps being interconnected for simultaneous movements, said flaps, when in open position, extending rearwardly from said fixed nozzle and diverging outwardly therefrom in a downstream direction.

References Cited in the file of this patent

UNITED STATES PATENTS

| 1,387,364 | Dever | Aug. 9, 1921 |
| 2,569,497 | Schiesel | Oct. 2, 1951 |
| 2,682,147 | Ferris | June 29, 1954 |
| 2,697,907 | Gaubatz | Dec. 28, 1954 |
| 2,770,944 | Jordan | Nov. 20, 1956 |
| 2,778,190 | Bush | Jan. 22, 1957 |

FOREIGN PATENTS

| 998,358 | France | Sept. 19, 1951 |
| 1,071,851 | France | Mar. 10, 1954 |